United States Patent
Xing et al.

(10) Patent No.: US 10,073,870 B2
(45) Date of Patent: Sep. 11, 2018

(54) METHOD AND APPARATUS FOR PROVIDING DATA CORRECTION AND MANAGEMENT

(71) Applicant: HERE Global B.V., Veldhoven (NL)

(72) Inventors: Ye Xing, Burlington, MA (US); Tao Wu, Andover, MA (US)

(73) Assignee: HERE Global B.V., Veldhoven (NL)

( * ) Notice: Subject to any disclaimer, the term of this patent is extended or adjusted under 35 U.S.C. 154(b) by 577 days.

(21) Appl. No.: 13/935,896

(22) Filed: Jul. 5, 2013

(65) Prior Publication Data

US 2015/0012501 A1    Jan. 8, 2015

(51) Int. Cl.
*G06F 17/30* (2006.01)

(52) U.S. Cl.
CPC .. *G06F 17/30303* (2013.01); *G06F 17/30371* (2013.01); *G06F 17/30864* (2013.01)

(58) Field of Classification Search
CPC ................................. G06F 17/30303
USPC ......................... 707/687, 690–692
See application file for complete search history.

(56) References Cited

U.S. PATENT DOCUMENTS

| | | | | |
|---|---|---|---|---|
| 8,402,543 B1 * | 3/2013 | Ranjan et al. | | 726/23 |
| 8,526,743 B1 * | 9/2013 | Campbell | | G06K 9/6202 382/181 |
| 2005/0120006 A1 * | 6/2005 | Nye | | G06F 17/30705 |
| 2005/0240592 A1 * | 10/2005 | Mamou et al. | | 707/9 |
| 2006/0039610 A1 * | 2/2006 | Cantral | | G06K 9/2054 382/190 |
| 2008/0319652 A1 | 12/2008 | Moshfeghi | | |
| 2009/0119268 A1 * | 5/2009 | Bandaru | | G06F 17/2745 705/7.12 |
| 2009/0198767 A1 | 8/2009 | Jakobson et al. | | |
| 2010/0048242 A1 * | 2/2010 | Rhoads et al. | | 455/556.1 |
| 2010/0145902 A1 * | 6/2010 | Boyan | | G06F 17/3089 706/54 |
| 2012/0059853 A1 * | 3/2012 | Jagota | | G06F 17/30241 707/780 |
| 2012/0179364 A1 | 7/2012 | Chang | | |
| 2012/0197907 A1 * | 8/2012 | Malyshev | | G06Q 10/107 707/749 |
| 2012/0260209 A1 * | 10/2012 | Stibel | | G06Q 30/018 715/780 |
| 2012/0320089 A1 | 12/2012 | Kreft | | |

(Continued)

FOREIGN PATENT DOCUMENTS

WO     2012034578 A1    3/2012

OTHER PUBLICATIONS

Arge, "Aggregation of POI Data extracted from Web Resources (PoiBank)", dated Apr. 22, 2011, <URL: http://www.ideal-ist.eu/ps/aggregation-poi-data-extracted-web-resources-poibank >, retrieved May 3, 2013, pp. 1-2.

*Primary Examiner* — Mark D Featherstone
*Assistant Examiner* — Diedra McQuitery
(74) *Attorney, Agent, or Firm* — Ditthavong & Steiner, P.C.

(57) ABSTRACT

An approach is provided for determining at least one entity specified in at least one data record. The approach further involves determining one or more data sources available from the at least one entity. The approach further involves processing and/or facilitating a processing of the one or more data sources to determine information for a verification, an update, or a combination thereof of the at least one data record.

19 Claims, 11 Drawing Sheets

(56) References Cited

U.S. PATENT DOCUMENTS

2012/0330721 A1* 12/2012 Volpe .................. G06Q 30/0201
                                                    705/7.32
2013/0013927 A1*  1/2013 Stibel ................... G06Q 10/107
                                                    713/172

* cited by examiner

METHOD AND APPARATUS FOR PROVIDING DATA CORRECTION AND MANAGEMENT

BACKGROUND

Up-to-date data for record items such as, for example, point of interest addresses, are a useful tool for both businesses and individuals. Management of such databases can be problematic because of the volume of records and their sporadic updates. For example, databases continue to grow as new records are collected and/or saved digitally, which makes maintaining accuracy challenging. Additionally, record information, such as addresses, is rarely static, making it imperative that service providers remain vigilant in keeping the most up-to-date databases. Further, business clients and consumers have come to expect only the highest level of accuracy in record items. Thus, with such a small margin for imperfection, businesses are faced with paying for the very expensive, inefficient, and time consuming manual maintenance of records.

SOME EXAMPLE EMBODIMENTS

Therefore, there is a need for an approach for monitoring and/or correcting data from a variety of sources using pattern extraction, pattern recognition, and/or partial pattern matching.

According to one embodiment, a method comprises determining at least one entity specified in at least one data record. The method also comprises determining one or more data sources available from the at least one entity. The method further comprises processing and/or facilitating a processing of the one or more data sources to determine information for a verification, an update, or a combination thereof of the at least one data record.

According to another embodiment, an apparatus comprises at least one processor, and at least one memory including computer program code for one or more computer programs, the at least one memory and the computer program code configured to, with the at least one processor, cause, at least in part, the apparatus to determine at least one entity specified in at least one data record. The apparatus is also caused to determine one or more data sources available from the at least one entity. The apparatus is further caused to process and/or facilitate a processing of the one or more data sources to determine information for a verification, an update, or a combination thereof of the at least one data record.

According to another embodiment, a computer-readable storage medium carries one or more sequences of one or more instructions which, when executed by one or more processors, cause, at least in part, an apparatus to determine one or more data sources available from the at least one entity. The apparatus is also caused to determine one or more data sources available from the at least one entity. The apparatus is further caused to process and/or facilitate a processing of the one or more data sources to determine information for a verification, an update, or a combination thereof of the at least one data record.

According to another embodiment, an apparatus comprises means for determine one or more data sources available from the at least one entity. The apparatus also comprises means for determine one or more data sources available from the at least one entity. The apparatus further comprises means for process and/or facilitate a processing of the one or more data sources to determine information for a verification, an update, or a combination thereof of the at least one data record.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for monitoring and/or correcting data from a variety of sources using pattern extraction, pattern recognition, and/or partial pattern matching. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
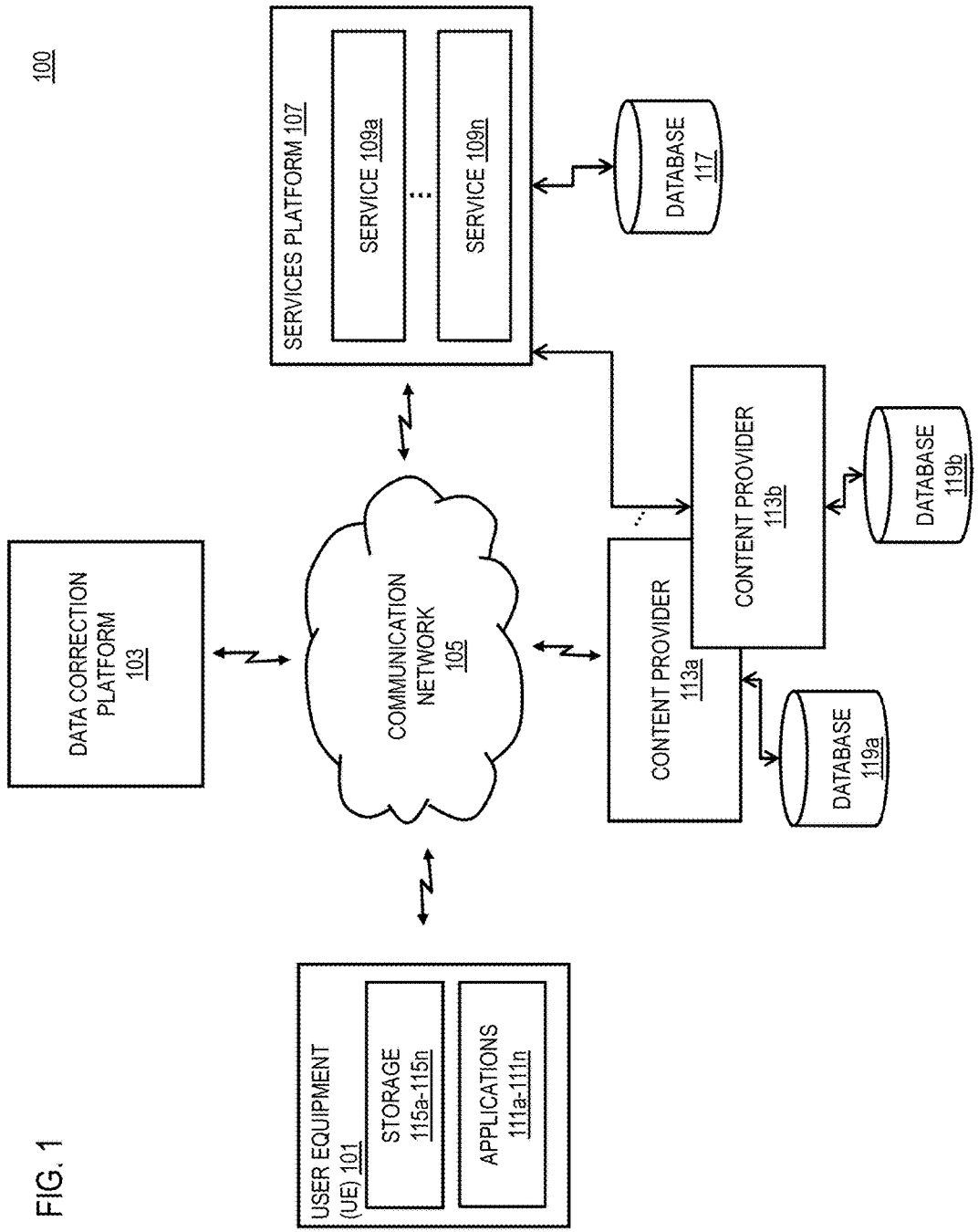
FIG. 1 is a diagram of a system capable of monitoring and/or correcting data from a variety of sources using pattern extraction, pattern recognition, and/or partial pattern matching, according to one embodiment.

FIG. 1 is a diagram of a system capable of monitoring and/or correcting data from a variety of sources using pattern extraction, pattern recognition, and/or partial pattern matching. Businesses and consumers require a reliable and efficient way of maintaining the accuracy of the records in their databases. Databases of information have become an integral part of many businesses' technology-based offerings and consumers have become accustomed to data that reflects real-time changes in the real world. Thus, a database's value is directly tied to its ability to provide continuously up-to-date and accurate information on whichever subject they are reporting upon. As noted above, it can be a challenge for service providers to maintain up-to-date information for items such as, for example, point of interest addresses or telephone information, at all times. As often found in the case for businesses, these databases may contain tens of millions of point of interests. The information changes for each of these points of interests generally occur at haphazard and difficult to predict time intervals. For example, one point of interest address may not change for twenty years while another changes every few months. The volume of these databases makes manual accuracy checks near-impossible, time-consuming, and costly.

To address this problem, a system 100 of FIG. 1 introduces the capability to monitor and correct data from a variety of sources using pattern extraction, pattern recognition, and partial pattern matching to determine whether to verify and/or update a record item. In the various embodiments described herein, a database may be any system that produces and manages data, for example, for a point of interest (POI), from multiple sources as input and blends them to produce the output. Additionally, database information is indicated based on a point of interest (e.g., a business, location based on longitude and latitude, or contacts in a user's phone) and its associated information (e.g., address, phone number, hours of operation, email, web address, fax, etc.). However, it is contemplated that various embodiments described herein are applicable to any database entity, comprising of: non-point of interest based facts, such as statistics, real estate trends, market records, weather patterns, traffic history, business history, election records, personal resumes, contact information, family histories, etc. Additionally, a component may be a subelement of a records' associated information (e.g., house number, street name, street suffix, city name, state name, zip code, area code, seven digit phone number, extension, domain, subdomain, etc.). A record may be composed of an entity and its associated components. A source may be a source of information from which the system 100 may extract data (e.g., website, directory, images, etc.).

In one embodiment, the system 100 provides the capability of determining the accuracy of items in a database by extracting data from a website (e.g., the POI's website), to determine whether the stored data is accurate. After determining an entity, such as a POI, to investigate, the system 100 uses data crawled from the POI's website to automatically detect whether the database's output is correct. Machine learning techniques are used to achieve this. Once again, while address correction is the focus of this embodiment, the system 100 may be implemented in a myriad of other facts, history, or records of information (see above). The system 100 may determine that a record corresponds to a POI and certain characteristics associated with the POI, one of which may be the POI's physical address. The system 100 may determine the record requires updating if the source does not match the record. The system 100 may access: the POI's website, an indexed listing such as a listing directory, or even user created and submitted content, like a picture of a menu, and extract plain text from the source to compare with the address in the database. The system 100 may aggregate and organize the information from one or more sources to verify or update the record. The system 100 builds a classifier based on the similarity of the database's POI address. The classifier uses the POI's website as the independent, reliable, and updated source to provide ground truth and correct a database's record. The classifier uses pattern extraction, pattern recognition, and pattern matching to quantify the similarity between the source and the record. Therefore, system 100 may determine at least one entity specified in at least one data record, determine one or more data sources available from the at least one entity, and processing and/or facilitate a processing of the one or more data sources to determine information for a verification, an update, or a combination thereof of the at least one data record, wherein the one or more data sources include, at least in part, online materials, offline materials, or a combination thereof published by the at least one entity, wherein the online materials include, at least in part, at least one website of the at least one entity, the method further comprising, at least in part, a crawling of the at least one website to determine the information.

The classifier uses the POI's website as the independent, reliable and updated source to provide the ground truth and correct the database's POI address. The selection of the POI's website as the ground truth solves the problem of finding a reliable provider, as it usually contains the most updated accurate information of the POI. For example, if a POI item is listed as Dusty's Burgers, the classifier may utilize the Dusty's Burgers website to determine POI address accuracy. Therefore, the system 100 may cause, at least in part, a specification of the information as a ground truth, and determine the difference in relation to the ground truth.

In one embodiment, the classifier may automatically detect the incorrect address in the database's POI from the plain text data in the website by using techniques such as pattern extraction, pattern recognition, and pattern matching to quantify the similarities between the two addresses. In the Dusty's Burgers example, the website may report 25 Smith Avenue as the address. The system 100 may extract "25 Smith Avenue" as plain text, while the classifier may recognize the "24 Smith Avenue" as part of a POI's address pattern following the same formula as house number, street name, and street suffix, where "24" is the house number, "Smith" is the street name, and "Avenue" is the street suffix. The system 100 may then compare these components with the Dusty's Burgers address in the database, which may have "25 Smith Street" as the first line of the address. The system 100 may recognize that the street numbers are both "25" and the street names are both "Smith." However the system 100 may also recognize that the street suffix from the source is "Avenue" while the street suffix in the database record is "Street." The system 100 will recognize that the street suffixes do not match. The system 100 may then update the street suffix to match the address found on the website because the system 100 considers the POI's website the ground truth. Thus, the new address in the database for Dusty's Burgers may be "25 Smith Avenue." Therefore, the system 100 may determine that there is a difference between information and one or more fields of the at least one data record, wherein the verification, the update, or a combination thereof of the at least one data record is based, at least in part, on the difference, wherein the processing of the one or more data sources to determine the information is based, at least in part, on a pattern extraction, a pattern recognition, a pattern matching, or a combination thereof.

In another embodiment, the system 100 may automatically detect an incorrect address from an offline source that is associated with a POI. According to one embodiment, a user may be at the POI location when the system 100 recognizes that the user is at the location. The system 100 may prompt the user to take a picture of a menu, signage, or any physical object at the restaurant capable of bearing the POI's basic information, such as address. When the user takes a picture of a menu and uploads to the system 100, the system 100's classifier may treat the data found in the picture much like online data. That is, the classifier may extract the plain text data from the user's picture and proceed to extract information matching the pattern the classifier seeks to verify, such as the POI's address. Once the classifier extracts and identifies the patterns associated with the extracted plain text, the system 100 may process this information the same as it would the information derived from the POI's website. That is, the system 100 may utilize pattern matching to determine whether the current address in the database's file is in accord with the address extracted from the user's picture. Thus, the system 100 may cause, at least in part, a conversion for the one or more physical documents into one or more digital documents; and process and/or facilitate a processing of the one or more digital documents to determine the information, wherein the offline materials include, at least in part, one or more physical documents.

Partial pattern matching is a flexible and fuzzy method and provides an alternative to exact matching of the data record between the POI's address in the database and the POI's address as listed on the POI's website. Partial pattern matching may capture the most salient features of an address from plain text, like house number. At the same time, this partial pattern matching method allows some un-salient discrepancies between the source and the record. Examples of salient patterns may include: the first component of an address is usually the house number, which is numerical; the second component of an address is the street name, which is a string; the third component of an address is the zip code, which is composed of a five-digit number. The reason to allow the existence of the discrepancy in the un-salient patterns which do not affect the accuracy of the address, e.g., abbreviations and full names of state, is because one address may have "Massachusetts" and the other has "MA," but both forms of writing represents the same state. To continue with the Dusty's Burgers example, the database's address may have "25 Smith Ave., Los Angeles, Calif. 90038" while the extracted plain text from the website reports "25 Smith Avenue, LA, Calif., 90038-5113." A classifier using an exact matching algorithm for these two addresses may not recognize they are addresses for the same POI because the record shows "Los Angeles" as the city, while the source has "LA" as the city. An exacting matching algorithm may not recognize that "LA" is an abbreviation for "Los Angeles." Additionally, an exact pattern matching algorithm may not recognize that "CA" is an abbreviation for "California." However, a classifier using partial pattern matching and the above three salient patterns in the database as a guide, the system 100 may determine that the current address in the database may have a good chance to be an accurate address because it may recognize that "LA" is an abbreviation for "Los Angeles" and "CA" is an abbreviation for "California," and thus constitute a match between the source and record.

According to one embodiment, the classifier may determine whether the database address matches the address from the website. If there is a match, it may indicate the database address is correct. If there is not a match with the record, but there is a valid address pattern detected in the plain web text, then it indicates the database address has a high chance of being inaccurate. Thus, the system 100 may verify that the current address for the POI in the database is accurate or require additional information before confirming, depending on the thresholds for confirmation and accuracy set by the system's user or learned through machine learning. Additionally, the system 100 may generate a report indicating that the address is either verified, corrected, or may require additional sources before it may be verified or updated. The report may also list records that have had their addresses confirmed, changed, or requires further data sources. Thus, the system 100 may determine whether (a) to initiate the verification, the update, or a combination; (b) to present a message, a report, or a combination thereof regarding the verification, the update, or a combination thereof; or (c) a combination thereof based, at least in part, on a degree of the difference, wherein the at least one entity is a point of interest, a contact, or a combination thereof, and wherein the information includes, at least in part, an address, an attribute, or a combination thereof.

According to one embodiment, the system 100 may assign a weight or allow a user to assign a weight to the various sources and/or components within a record item. According to one embodiment, these weights may help the system 100 determine the treatment of variations from the database's record with that of the source's. According to one embodiment, these weights may be automatically trained by the system 100 or set according to user preferences. Additionally, weights may be associated with sources based on their reliability. Weights may also be associated with various components of the POI's address (e.g., house number, street name, zip code, etc.). For example, a system 100 may be programmed to treat the address information from a POI's website as irrefutable evidence of information, giving it the greatest weight of five out of five. Meanwhile, a user submitted image may be assigned a slightly lower weight of four out of five. A directory listing may have only a weight of two out of five. Thus, if the database's POI address is different in one or more components from the POI's website address, the system 100 may be configured to automatically update the new address. However, in another example, if the database's POI address contains one or more components which differ from a directory listing, the system 100 may not change the address automatically, but instead flag the address as possibly inaccurate pending further sources. According to one embodiment, a user may program how the system 100 may treat differences from various sources. According to another embodiment, the system 100 may determine the treatment based on machine learning. Thus, the system 100 may determine one or more weighting factors associated with the one or more data sources, the information, or a combination thereof, wherein the verification, the update, or a combination thereof is further based, at least in part, on the one or more weighting factors.

As shown in FIG. 1, the system 100 comprises a user equipment (UE) 101 having connectivity to the data correction platform 103 via a communication network 105. By way of example, the communication network 105 of system 100 includes one or more networks such as a data network, a wireless network, a telephony network, or any combination thereof. In one embodiment, data correction platform 103 includes one or more services 109a-109n (also collectively referred to as services 109) (e.g., POI information services, navigation services, media content services, etc.) that provide service functions and/or content using information or data stored in one or more databases to businesses and consumers. Services 109 may be hosted and managed by a services platform 107. In one embodiment, database 119a-119b (collectively referred to as databases 119) may be maintained by one or more content providers 113a-113n (also collectively referred to as content providers 113). Database 117 may be maintained by services platform 107, which may use the databases 119 as a cross-reference. A content provider (e.g., content provider 113a) may be entity websites, directory lists, or other web-based content fed by database 117's records. By way of example, the data correction platform may utilize the information from content providers 113 to maintain database 117.

According to one embodiment, the database 117 may be a master database, but in alternate embodiments, the client side storage 115a-115n (collectively referred to as storage 115) may represent a compiled database that may be used in or with end user devices (e.g., UEs 101) to provide data accuracy services. For example, the storage 115 may be used with the end user device 101 to provide an end user with contact, POI, or other entities component verification and correction features. In such a case, the storage 115's records may be downloaded or stored on the end user device UE 101, via applications 111a-111n (collectively referred to as applications 111), or the end user device UE 101 may access the databases 119 and 117 through a wireless or wired connection (such as via a server and/or the communication network 105), for example.

According to one embodiment, when a user of UE 101 enters a point of interest, the UE 101's internal global positioning system may detect the geographical location of the end user. The application 111 may determine that the user is at a POI and prompt the user to take a photograph of a menu, signage, or other physical display of the POI's address or other information. According to one embodiment, the application 111 may reward the user with points as part of an on or offline game as an incentive to create the source. According to another embodiment, the user may be motivated to contribute the picture knowing that the application 111 may update the user's local storage 115 with the information captured and update the user's other UE 101 applications with this information. Other applications which may utilize this type of information may be the user's address book or navigation system for quick recall the next occasion the user wishes to visit this POI. Once this image has been captured, the application 111 may utilize the pattern extraction, identifying, and matching mechanism to distill the pertinent POI information whether it be an address, phone number, hours of operation, lunch specials, etc., or a combination thereof. This data may be stored in storage 115 or database 117.

According to another embodiment, the picture which was taken in the previous example by the UE 101 may be transmitted via the communication network 105 to the data correction platform 103, which may receive the picture and perform the pattern extracting, recognition, and matching of the photo. According to another embodiment, the data correction platform 103 may receive the data from the UE 101 already processed (for example, with patterns extracted and/or recognized), and ready for matching with the record components. The data correction platform may leverage the information derived from the user's picture against the data crawled and extracted from the content providers 113. The data correction platform 103 may assign various weights to the data based on the content and according to the components therein. The data correction platform 103 may either verify and/or update the data record based upon the weight-based algorithm set forth by the user or acquired from machine learning. Additionally, the data correction platform 103 may create a report based on the actions taken with respect to blending the data recently acquired from sources with the existing database 117 records. The services 109 may access the databases 119 to collect data that reflects the most up-to-date information available for the respective POI or entity.

It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the end user device or UE 101 can be an in-vehicle navigation system, a personal navigation device (PND), a portable navigation device, a cellular telephone, a mobile phone, a personal digital assistant (PDA), a watch, a camera, a computer, and/or other device that can capture images, determine locations, and send and receive data. In one embodiment, the navigation device UE 101 can be a cellular telephone. In one embodiment, UE 101 is a client of at least one of the services 109 (e.g., a location-based service such as a mapping or navigation service) that depends on the information from the database 117. Accordingly, UE 101 includes a version of all or a portion of database 117 that is stored locally at UE 101 as storage 115. By way of example, UE 101 may execute one or more applications 111a-111n (e.g., client applications of the services 109) to access and/or execute one or more functions associated with the local storage 115.

By way of example, the UE 101, the data correction platform 103, the services platform 107, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
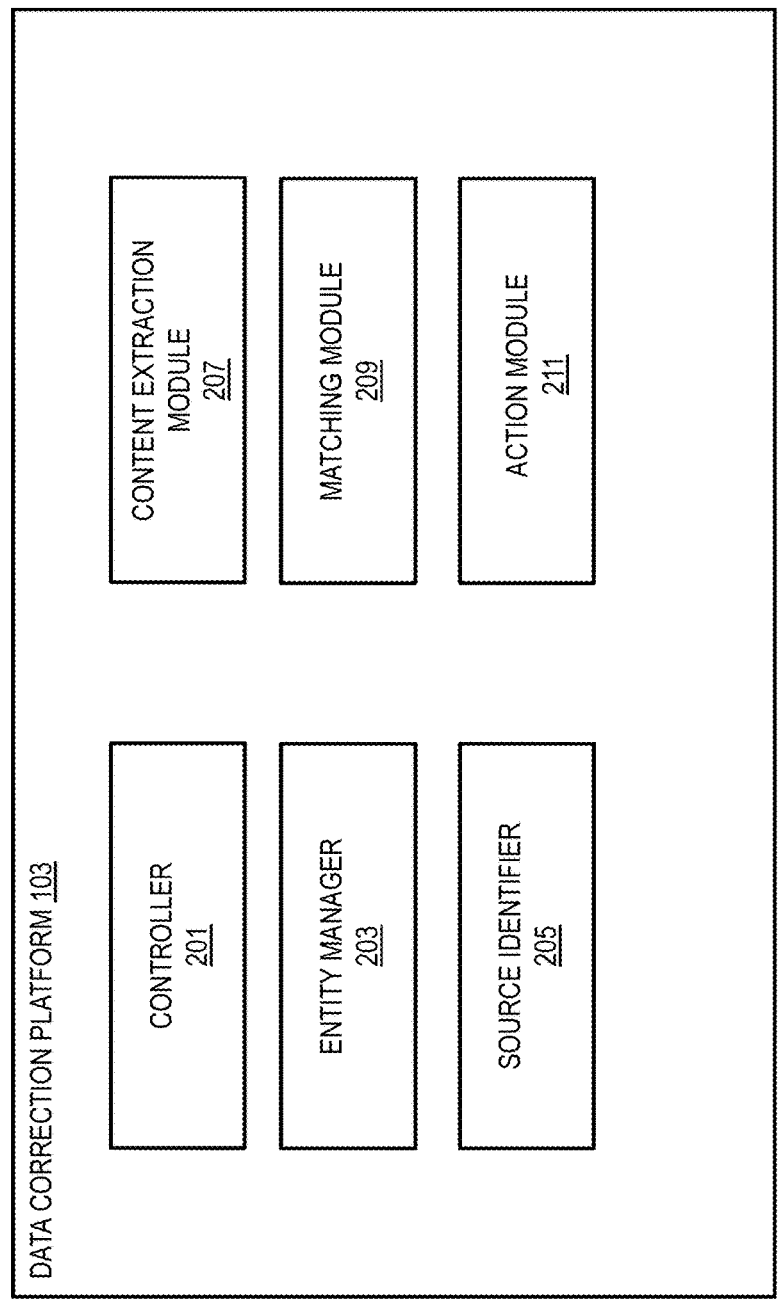
FIG. 2 is a diagram of the components of the data correction platform, according to one embodiment.

FIG. 2 is a diagram of the components of the data correction platform 103, according to one embodiment. By way of example, the data correction platform 103 includes one or more components for monitoring and/or correcting data from a variety of sources using pattern extraction, pattern recognition, and/or partial pattern matching. It is contemplated that the functions of these components may be combined in one or more components or performed by other components of equivalent functionality. In this embodiment, the data correction platform 103 includes a controller 201, entity manager 203, source identifier 205, content extraction module 207, matching module 209, and action module 211.

The controller 201 performs control logic functions and facilitates coordination among the other components of data correction platform 103. The entity manager 203 identifies the entity, for example, a POI, that is associated with a data record. The entity could be a business, contact, family (for family records), city or town (for historical records or weather patterns, etc.). Once the entity manager 203 identifies the entity, the source identifier 205 may identify which sources the data correction platform 103 may pull plain text data from. Examples of such sources may include internet websites (particularly those belonging to the entity), directory listings, records, emails, images of menus, signage, fliers, etc. After the source identifier 205 has identified one or more sources that are pertinent to the entity, the content extraction module 207 may seek to find patterns in the plain text that may reflect a record item such as an address, phone number, email address, etc., and extract those items from the entity source. The content extraction module 207 may be programmed with patterns for record items such as a United States postal address. The content extraction module 207 may look for clusters of text that may conform to a pattern such as: house number, street name, street suffix, city name, state name, and zip code. In another example, the content extraction module 207 may be programmed to identify an email address, in which case the content extraction module 207 may search for a pattern requiring a username, at sign, and domain name.

The matching module 209 may compare the extracted patterns of text identified by the context extraction module with the corresponding data record for the entity. For example, the matching module 209 may receive from the content extraction module 207 that an email address contains username "adam57", at sign, "somedomain.com." The email address listed in the database 117 shows the email address as "adam570", at sign, "somedomain.com." The matching module 209 may determine that a match does not exist and submit this database 117 item with an indication that the entity source extraction does not match the database 117 item because the extracted source user name contains a "0" at the end and the database 117 record username does not contain a "0" at the end.

According to one embodiment, the matching module 209 may observe a street address is "78 Park Street," while the database 117 item's address is listed as "78 Park St." The matching module 209 utilizes partial pattern matching so that it may identify that "St." is an abbreviation of "Street." The matching module 209 would thus determine that the entity source extraction matches the database 117 item.

The action module 211 may analyze the matching module's matches and determine whether the database 117 item requires verification and/or updating. The action module 211 may first determine whether the matching module has identified whether a match has been made between the extracted source text and the database 117 item. If the matching module 209 identifies a match, then the action module 211 may verify and log that the item in the database 117 has been verified as correct as of the date of the match. According to one embodiment, the action module 211 may determine the data item is verified as of the date of the source extraction, if the date of the extraction differs from the date of the match.

According to one embodiment, the action module 211 may assign weight to the sources and/or data item components if the matching module 209 reports that the extracted source text does not match the database 117 item. The weight for each source of data item component may be set by a user or leaned by the data correction platform 103 over time. For example, in the email address example above, if the source extraction is from an email header or signature, the weight may be higher than if the source had been from a website listing. According to one embodiment, the date of the source may also be a factor when determining the weight of a source. For example, a source that was created within twenty-four hours may carry more weight than a source that was created six months ago. For example, the action module 211 may not automatically update the email address if the extracted source is over five years old. Instead, the action module 211 may tag the data item as potentially incorrect and require a higher weighted data source or simply more data sources.

In addition to weighing sources, the action module 211 may also be programmed by a user or acquired by machine learning to set thresholds for component items. For example, something like an entity's street address may be more likely to change than the entity's state. Thus, component items like city or state may have higher weight points, creating a greater threshold before the action module 211 may change the information in the database 117. Therefore, according to one embodiment, in order for the action module to change an entity's highly weighed component like state, the source would have to carry an equal or greater weight.

Figure 3:
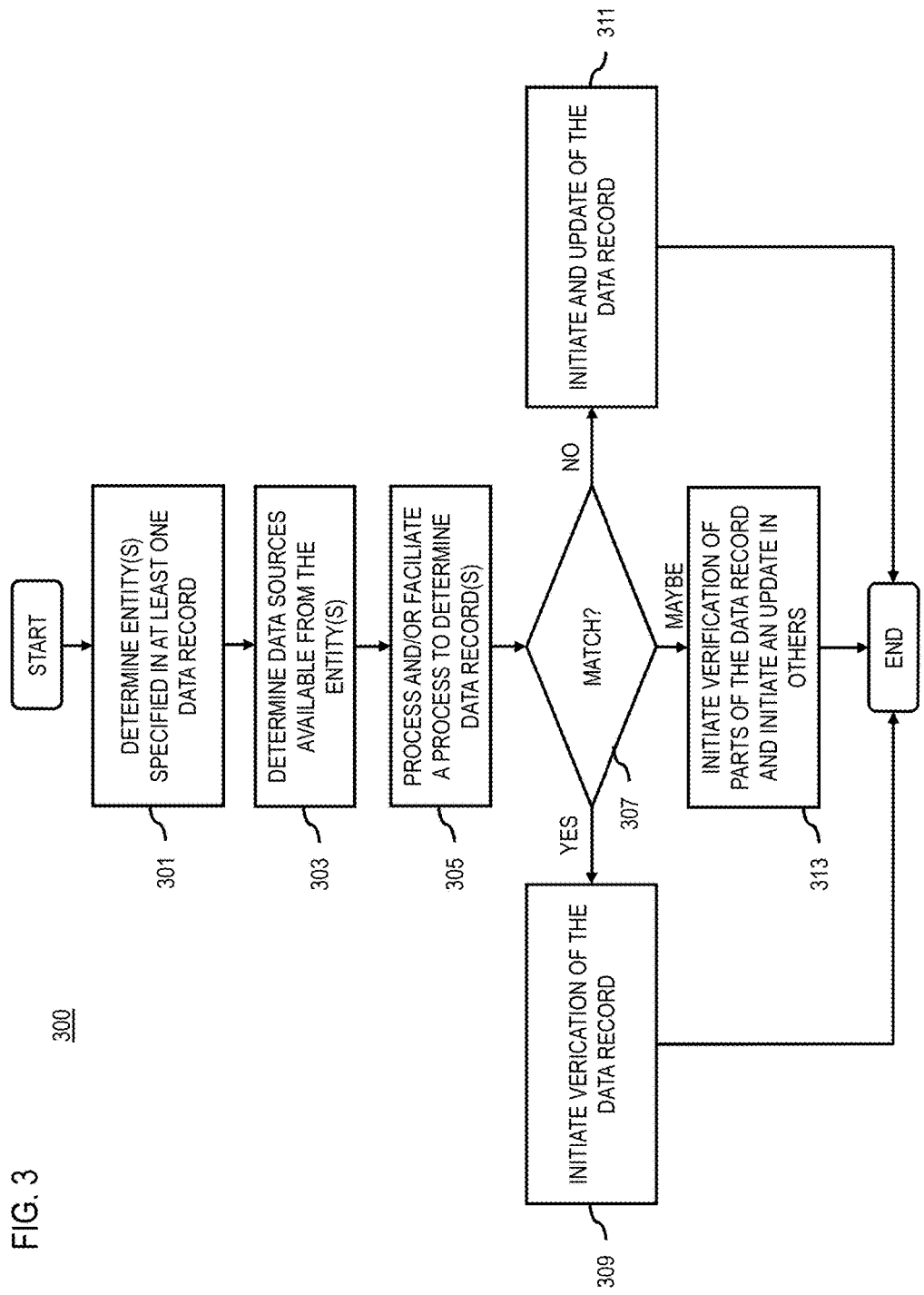
FIG. 3 is a flowchart of a process for the process of monitoring and/or correcting data from a variety of sources using pattern extraction, pattern recognition, and/or partial pattern matching, according to one embodiment.
Figure 10:
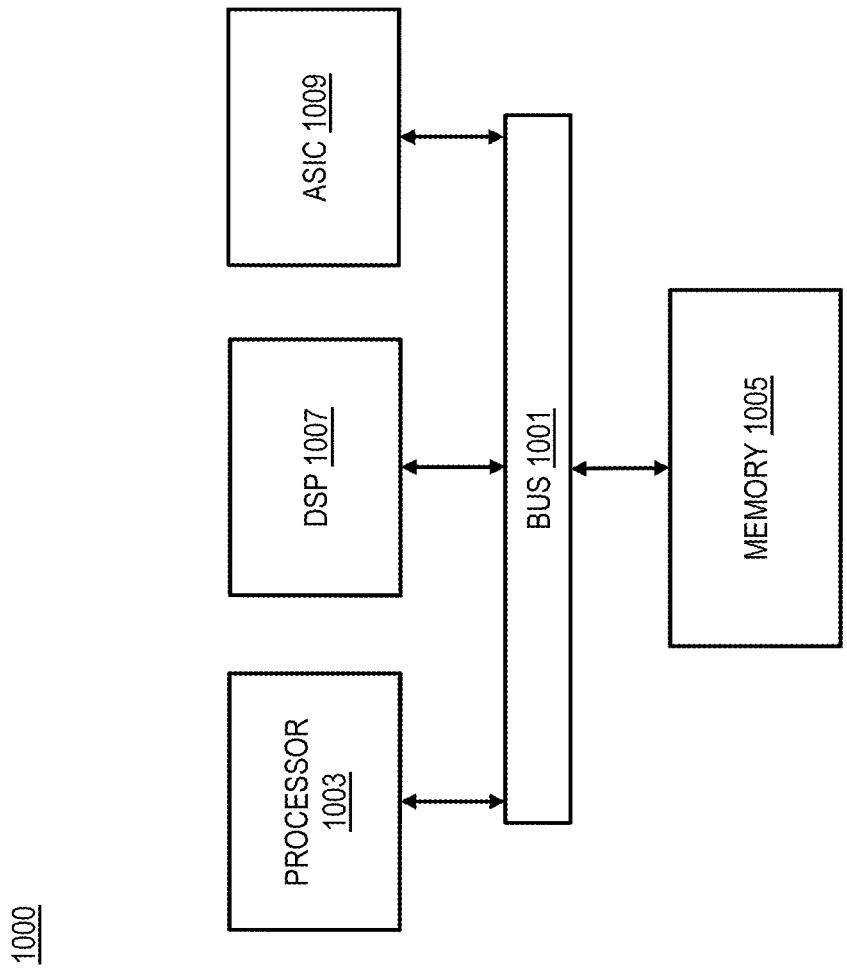
FIG. 10 is a diagram of a chip set that can be used to implement an embodiment of the invention.

FIG. 3 is a flowchart of a process for monitoring and/or correcting data from a variety of sources using pattern extraction, pattern recognition, and/or partial pattern matching, according to one embodiment. In one embodiment, the data correction platform 103 performs the process 300 and is implemented in, for instance, a chip set including a processor and a memory as shown in FIG. 10. Although FIG. 3 illustrates steps 301 through 313 in a particular order, the order and number of steps are merely for explanation, and one or more steps may be performed in a different order or removed. In step 301, the data correction platform 103 may determine at least one entity specified in at least one data record. According to one embodiment, the data correction platform 103 may identify the entity within the database 117 to determine the entity associated with the record. For example, the entity may be a business, contact, etc. The data correction platform 103 may use the entity's name to narrow down the list of possible entities. The data correction platform 103 may further use the additional components listed with the record to further aid the identification process. For example, the data correction platform may find that Mac's Fish Shop is the name of the business. Additionally, the data correction platform may note that Mac's Fish Shop only has one address, thus indicating that Mac's Fish Shop is likely a small business. The data correction platform may also notice that the current address of Mac's Fish Shop is Alaska. Thus, the data correction platform may derive that the entity is a small business based in Alaska and will search for sources associated with the entity accordingly.

In step 303, the data correction platform 103 may determine one or more data sources available from the at least one entity. Continuing from the Mac's Fish Shop example, the data correction platform may identify a number of websites for businesses called Mac's Fish Shop from the content providers 113. However, the data correction platform may disregard any individuals, families, and large businesses (businesses with multiple locations) with the name Mac's Fish Shop. Additionally, the data correction platform 103 may also disregard sources associated with small businesses called Mac's Fish Shops in states other than Alaska, such as Mac Fish Shop locations in Louisiana and Maine. Thus, as an example, the data correction platform may associate a small business located in Alaska called Mac's Fish Shop's website, directory listing, user submitted photos, emails, etc.

In step 305, the data correction platform 103 may process and/or facilitate a processing of the one or more data sources to determine information for a verification, an update, or a combination thereof of the at least one data record. Continuing with the Mac's Fish Shop example, the data correction platform 103 may pull two different addresses from the Mac's Fish Shop website. The data correction platform may note that the two locations are about fifty miles apart in different cities, but both still in the same state of Alaska. In step 307, the data correction platform 103 may determine if the source data matches the record item in the database 117. In step 309, the data correction platform may verify the record item in the database 117 if it determines that there is a match. For example, the data correction platform 103 may find that the first address from the Mac's Fish Shop website matches with the record address in the database 117 based on partial pattern matching. The data correction platform 103 may verify and create a report that the address in database 117 has been verified. In step 311, the data correction platform may initiate an update of the data record in the database 117 if there is not a match with the source. For example, the data correction platform 103 may find that the second address from the Mac's Fish Shop website does not match the address in the database 117. The data correction platform 103 may add the additional address to the database 117 instead of changing the current address since it pulled both addresses from the same source on the same day. The data correction platform 103 may add the second address as an additional location for the entity Mac's Fish Shop in the database 117. According to one embodiment, the user may program the data correction platform 103 to request the user's approval before adding additional locations. In step 313, the data correction platform may process a combination of verifying one part of the record item, while updating another part of the record item. In this example, the data correction platform verified the current address in the record item is correct while updating an additional address within the same record item.

Figure 4:
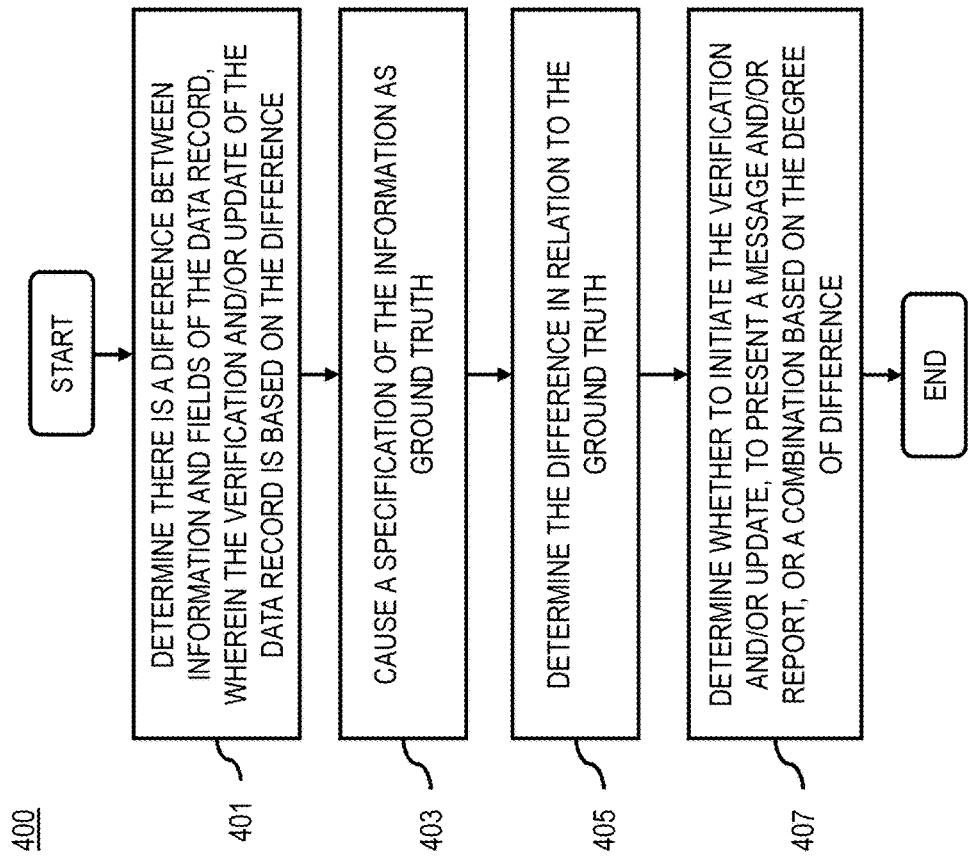
FIG. 4 is a flowchart of a process for monitoring and/or correcting data from a variety of sources using pattern extraction, pattern recognition, and/or partial pattern matching while using the entity's website as the ground truth, according to various embodiments.

FIG. 4 is a flowchart of a process for monitoring and/or correcting data from a variety of sources using pattern extraction, pattern recognition, and/or partial pattern matching while using the entity's website as the ground truth, according to one embodiment. In one embodiment, the data correction platform 103 performs the process 400 and is implemented in, for instance, a chip set including a processor and a memory as shown in FIG. 10. Although FIG. 4 illustrates steps 401 through 407 in a particular order, the order and number of steps are merely for explanation, and one or more steps may be performed in a different order or removed. In step 401, the data correction platform 103 may determine that there is a difference between a source and one or more components of the at least one data record. For example, the user of UE 101 may take a snapshot of John's business card. The content extraction module 207 may extract from the image of the plain text of the business card the contact's name, title, address, email, fax, and phone numbers. The data correction platform 103 may then scan the storage 115 for the closest matching contact. The matching module 209 may compare each component of the extracted information from the business card and compare it with the corresponding component in the storage's data item. If the matching module 209 notes that the street address on the card says "First" street but the street address in the storage item's data field contains "1$^{st}$" street, the matching module 209 would note the mismatch. However, due to partial pattern matching, the matching module 209 would be able to correctly identify that these two street names are different versions of the same name so there would, in fact, be a match. If the address on the card says "First Ave." and the address in the storage 115 reports "1$^{st}$ Dr.", the matching module 209 may note that there is a difference in the street suffix component of the data item. Further, the data correction platform 103 may also identify that this difference is outside the scope of partial pattern matching as "Ave." and "Dr." are not abbreviations of one another or otherwise equivalents.

In step 403, the data correction platform 103 may cause, at least in part, a specification of the information as a ground truth. In the above example, if there was a third source, and that third source is the contact's website, the data correction platform would consider the contact's website the highest level of authority with regard to the most accurate data item information.

In step 405, the data correction platform 103 may determine the difference in relation to the ground truth. For example, if the contact's website lists the contact's address as "First Blvd." the data correction platform 103 may note the difference between the user's website and the storage 115's data item component ("1$^{st}$ Dr."). The data correction platform may also note that the sources differ from one another as the business source lists the street suffix as "Ave." and the contact's website lists the street suffix as "Blvd." As stated above, partial pattern matching has determined that the street names are essentially a match. However, since the contact's website is considered the ground truth, the contact's website information may take precedence over all other sources and the storage 115's record. Thus, the data correction platform may update the contact's street suffix from "Dr." to "Blvd." to stay in accordance with the ground truth, which is the contact's website.

In step 407, the data correction platform 103 may determine whether (a) to initiate the verification, the update, or a combination; (b) to present a message, a report, or a combination thereof regarding the verification, the update, or a combination thereof; or (c) a combination thereof based, at least in part, on a degree of the difference. Thus, continuing with the above example, the data correction platform may verify the street name with the name in the storage 115, as the partial pattern matching has determined that the degree of difference between the source and the storage 115's records still constitute a match ("1$^{st}$" is the numerical equivalent to "First"). However, the data correction platform may update the street suffix to "Blvd." as the difference between the source and the storage 115's record amounts to a large enough difference to account for an update of the record. Thus, within the same entity (contact John), the data correction platform may verify some components of the record while updating other components of the record depending on the degree of difference discovered between the source and the contact. According to one embodiment, the data correction platform may automatically maintain a report of all of the verification and updates performed. Users may search these reports based on only updated records, verified records, or both. According to one embodiment, users may conduct searches based on a time frame (last year or a certain date range, etc.) or based on the type of contact (family, friends, business contacts, businesses, etc.). User may also order reports within a specific time frame for a certain type of entity. For example, a user may generate a report for business updates in 2010. According to one embodiment, these reports may be created on an ad-hoc basis and return results may be based on parameters set by the user.

Figure 5:
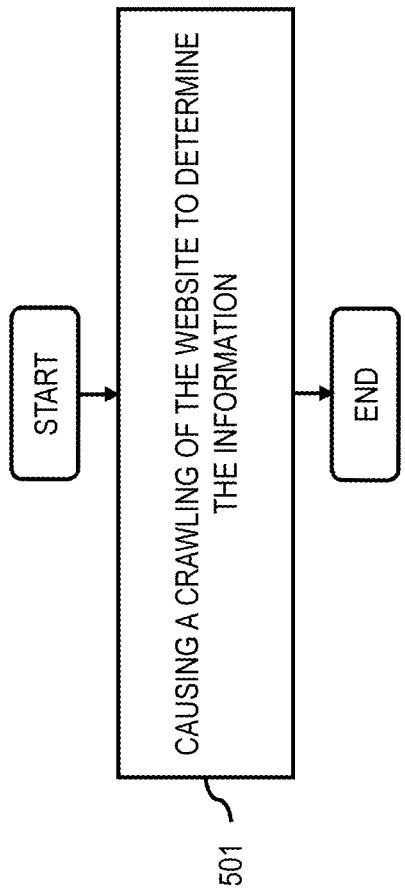
FIG. 5 is a flowchart of a process for using crawled website data to help determine the accuracy of database information, according to one embodiment.

FIG. 5 is a flowchart of a process for using crawled website data to help determine the accuracy of database information, according to one embodiment. In one embodiment, the data correction platform 103 performs the process 500 and is implemented in, for instance, a chip set including a processor and a memory as shown in FIG. 10. In step 501, the data correction platform 103 may cause, at least in part, a crawling of the at least one website to determine the information. According to one embodiment, the data correction platform 103 may access the content providers 113a-113b and the corresponding databases 119 via the communication network 105. As previously noted, the content providers may be websites, directory listings, and other means of raw data that may be available via the internet. The databases 119 may also store the data that is displayed on the content providers 113. Thus, the web crawler may systematically crawl the internet and the corresponding content provider databases 119 for the purpose of gathering sources with which to verify or update records. According to one embodiment, the data correction platform 103 may crawl the websites, copying all the pages visited for later processing by the data correction platform 103. According to one embodiment, the data correction platform may validate hyperlinks and HTML code associated with various entities of record via web crawling.

According to one embodiment, the frequency that the data correction platform may crawl websites for a particular entity may depend on user settings or the type of entity. Further, the frequency of crawling websites for a certain entity may be further refined through machine learning. For example, for entities whose information has historically remained the same, the data correction platform may not seek to verify the record as often as an entity that has historically had many record updates. Additionally, the size and type of the entity may present a factor when determining the frequency of web crawls. As an example, a small, family-owned shop may have never changed its location, while an up and coming dot com business is constantly expanding to larger and larger office spaces. Additionally, well established corporations with historic headquarters may also require less frequent web crawls.

Figure 6:
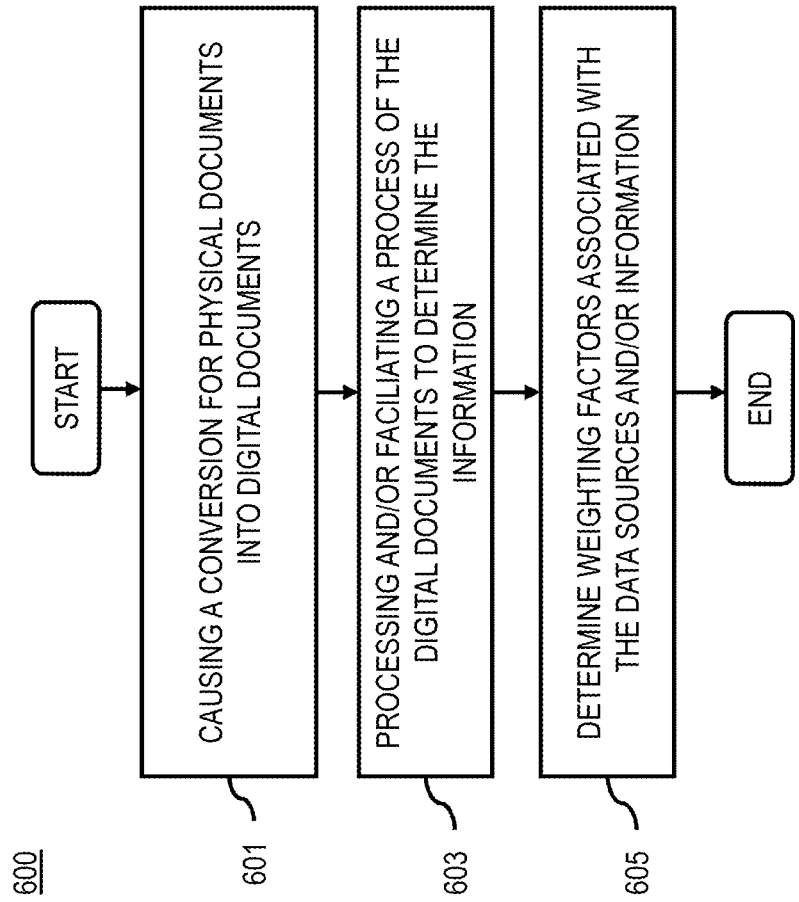
FIG. 6 is a flowchart of a process for converting physical sources and processing sources to determine the accuracy of components of database items based on a weight-based algorithm, according to one embodiment.

FIG. 6 is a flowchart of a process for converting physical sources and processing sources to determine the accuracy of components of database 117 items using a weight-based algorithm, according to one embodiment. In one embodiment, the data correction platform 103 performs the process 600 and is implemented in, for instance, a chip set including a processor and a memory as shown in FIG. 10. Although FIG. 6 illustrates steps 601 through 605 in a particular order, the order and number of steps are merely for explanation, and one or more steps may be performed in a different order or removed. In step 601, the data correction platform 103 may cause, at least in part, a conversion for the one or more physical documents into one or more digital documents. According to one embodiment, the data correction platform may scan images of plain text to extract patterns corresponding to components of records in the database 117. For example, a user of UE 101 may receive a take-out menu in the mail. The user may utilize the UE 101 to take a picture of the menu, thus digitalizing an off line document. In another example, a user may take a picture of a new contact's email address written on a napkin. In yet another example, a user may take a snapshot of a billboard advertising a new nightclub while in the passenger seat.

In step 603, the data correction platform 103 may process and/or facilitate a processing of the one or more digital documents to determine the information. According to one embodiment, all of the images in the above examples may be submitted to the data correction platform 103's pattern extraction, recognition, and matching of the plain text to record components. For example, the data correction platform 103 may determine the entity associated with the menu item using details like extracting the business's name, location, etc. The data correction platform 103 may further extract data informing of the restaurant's hours, location, fax, and telephone number. In the example with the email address on a napkin, the user may create a new contact to associate with this information. The data correction platform 103 may thus associate the extracted text with the newly created contact based on the user-created association. In the example with the nightclub billboard, the data correction platform 103 may recognize the entity, even though it may not yet be opened for business. The data correction platform 103 may have created this entity anew based on other sources, like the nightclub's website.

In step 605, the data correction platform 103 may determine one or more weighting factors associated with the one or more data sources, the information, or a combination thereof. According to one embodiment, the data correction platform 103 may contain an algorithm to assign various weights to either sources and/or record components. These weights may help the data correction platform determine the accuracy of various sources and the frequency of change for different components. According to one embodiment, the data correction platform may even assign weights according to the age of the source. The weights of components may indicate a threshold for update. For example, the greater the weight given to a component, the more reliable the source must be before the data correction platform 103 may update the information. Additionally, the time the current component has been in effective may add to its weight. For example, a business that has moved around within the city of Milwaukee may have a higher weight for its city and state than its street number, street name, or street suffix. Likewise, a contact with the same home phone number for 15 years may have a similarly high weight or threshold to overcome before the data correction platform 103 may update this data.

Figure 7:
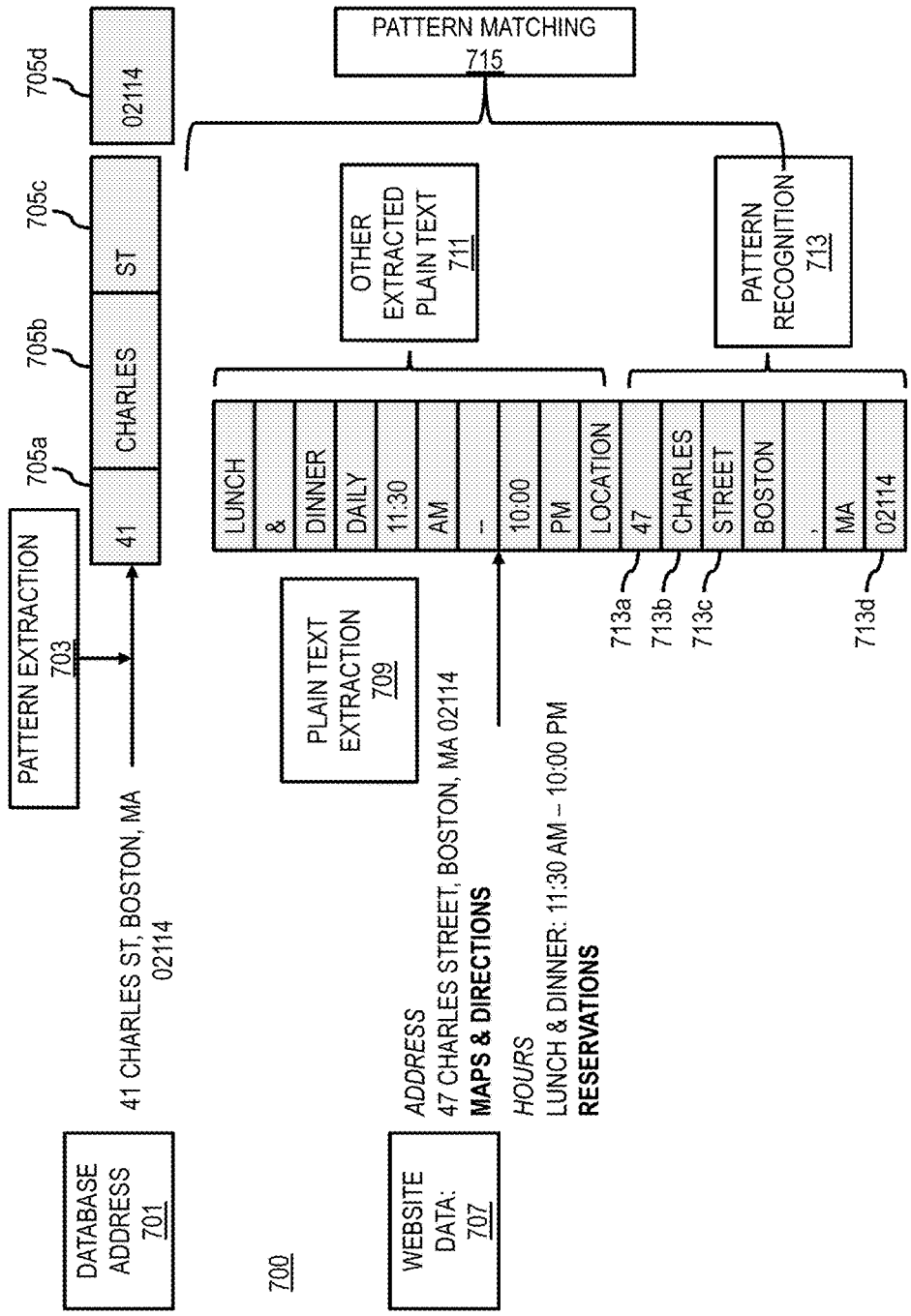
FIG. 7 is a diagram of pattern extraction, pattern recognition, and pattern matching based on crawled web data utilized in the processes of FIGS. 3-6, according to various embodiments.

FIG. 7 is a diagram of pattern extraction, pattern recognition, and pattern matching based on crawled web data utilized in the processes of FIGS. 3-6, according to various embodiments. The data correction platform 103 may first identify the database 117 address 701 for the entity in question. The data correction platform 103 my conduct a pattern extraction 703 to parse out the house number (705a), street name (705b), street suffix (705c), and the zip code (705d) from within the record. The data correction platform may identify the house number 705a as the first component of an address, usually composed of a number. The data correction platform 103 may distill the street name 705b as the second component of an address and the zip code 705d as the last component of an address, usually composed of five numbers. Once the data correction platform has identified the ground source entity's website data 707, the data correction platform may crawl the website data 707 and conduct a plain text extraction 709. The plain text extraction 709 may be separated item by item for easier pattern recognition. The matching module 209 may scan the items in search for a pattern that may match one or more record component patterns. The data correction platform 103 may recognize a pattern in the extracted text (pattern recognition 713). The data correction platform may match the pattern recognition 713 with the extracted pattern 705a-705d.

According to one embodiment, the pattern matching algorithm may match the pattern identified by pattern recognition 713 with the pattern extraction 703. That is, the salient patterns for an address exists in that the first component is a house number composed of numbers, the second component is a street name composed of a string, and the last component is composed of a zip code, made up by a five-digit number. The data correction platform 103 may determine the identical components in the pattern extraction 703 and the pattern recognition 713 and surmise that both of these patterns comprise address information. According to one embodiment, the data correction platform 703 may compare and contrast each component between the two addresses. For example, in this scenario, the house number in the pattern extraction is 41 (705a) and the house number from the website reports 47 (713a). The data correction platform 103 may determine that there is not a match in the house numbers and depending on the user settings, the data correction platform may either update the database 117 address 701 or notify the user of the mismatch to obtain authorization to update the house number in the database 117 address 701. The data correction platform 103 may determine that a match exists in the street names with both 705b and 713b reporting the street name is Charles. The data correction platform 103 may determine that the street suffixes are not an exact match as 705c is the abbreviation (St.) of 713c (Street). However, the data correction platform 103's flexible and fuzzy method of partial pattern matching may identify that "St." is an abbreviation of "Street" and ultimately determine that a match exists in the street suffix. The data correction platform 103 may determine that the five digit zip codes are a match as both 705d and 713d report the five digit number, "02114."

Figure 8B:
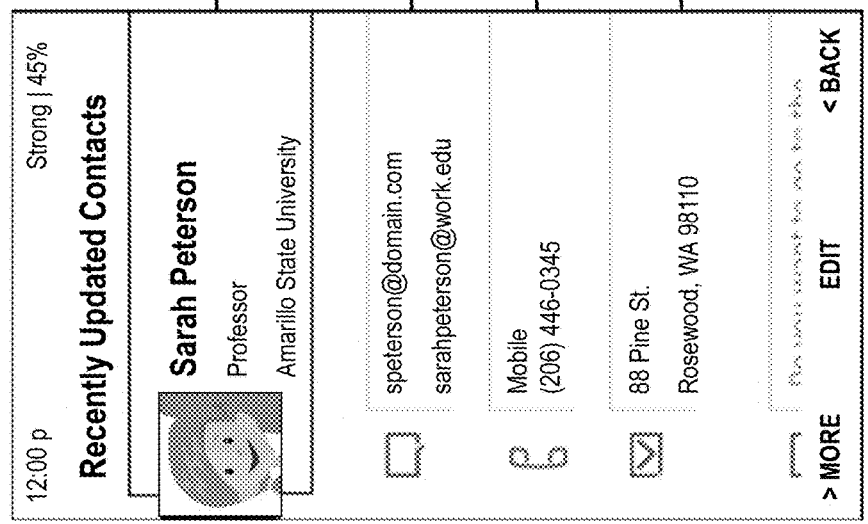
FIGS. 8A-8B are diagrams of user interfaces utilized in the processes of FIGS. 3-6, according to various embodiments.
Figure 8A:
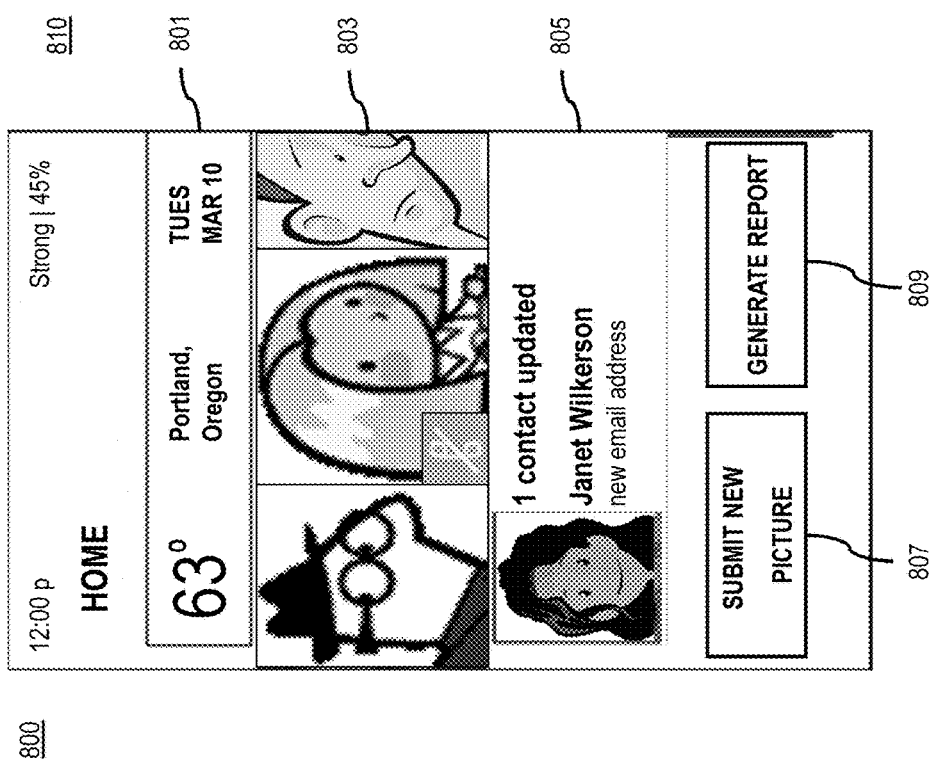

FIGS. 8A-8B are diagrams of user interfaces utilized in the processes of FIGS. 3-6, according to various embodiments. According to one embodiment, the user interface 800 may exemplify the home screen of application 111 as seen on UE 101. According to one embodiment, header 801 displays a panel of local information such as weather, location, and date. The images in section 803 may reflect recent contacts which were recently updated by the application 111, either automatically via recent web crawls or manually upon the user's submission of additional sources. Section 805 displays the latest contact that was updated with the information that had been updated by the application 111. Button 807 may be selected if the user wishes to submit a new picture to be scanned for pattern extraction, recognition, and matching. According to one embodiment, the user would not have to select a relevant contact; the user would only have to submit the picture and the application 111 and/or the data correction platform 103 may automatically determine which contacts are relevant the update, allowing the user a much quicker means of updating his contact lists. According to one embodiment, the user may allow the application 111 permission to access his emails so that the application 111 may also automatically update extracted text that may be relevant to any current contacts within storage 115. With the Generate Report button 809, the user may prompt the application 111 to generate a report of recently verified and/or updated addresses. According to one embodiment, the user may also set these reports to be generated automatically at present intervals and/or have these reports automatically sent to his email address or messaged to his phone number.

FIG. 8B is a diagram of user interface 810 that displays a detailed recently updated contact page. Section 811 displays the contacts picture, name, title, and place of employment. Such information may be updated automatically. Additionally, the user may set permissions allowing the application 111 to access his social networking contacts as a source. Section 813 displays the contact's email, 815 displays the contact's phone numbers, and 817 displays the contact's address. According to one embodiment, the information order may be adjustable by the user. According to one embodiment, the user may set permissions as to which (if any of these fields 813-817) application 111 is allowed to verify or update automatically. For example, the user may allow the application 111 to verify and/or update the contact's phone number only.

The processes described herein for monitoring and/or correcting data from a variety of sources using pattern extraction, pattern recognition, and/or partial pattern matching may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
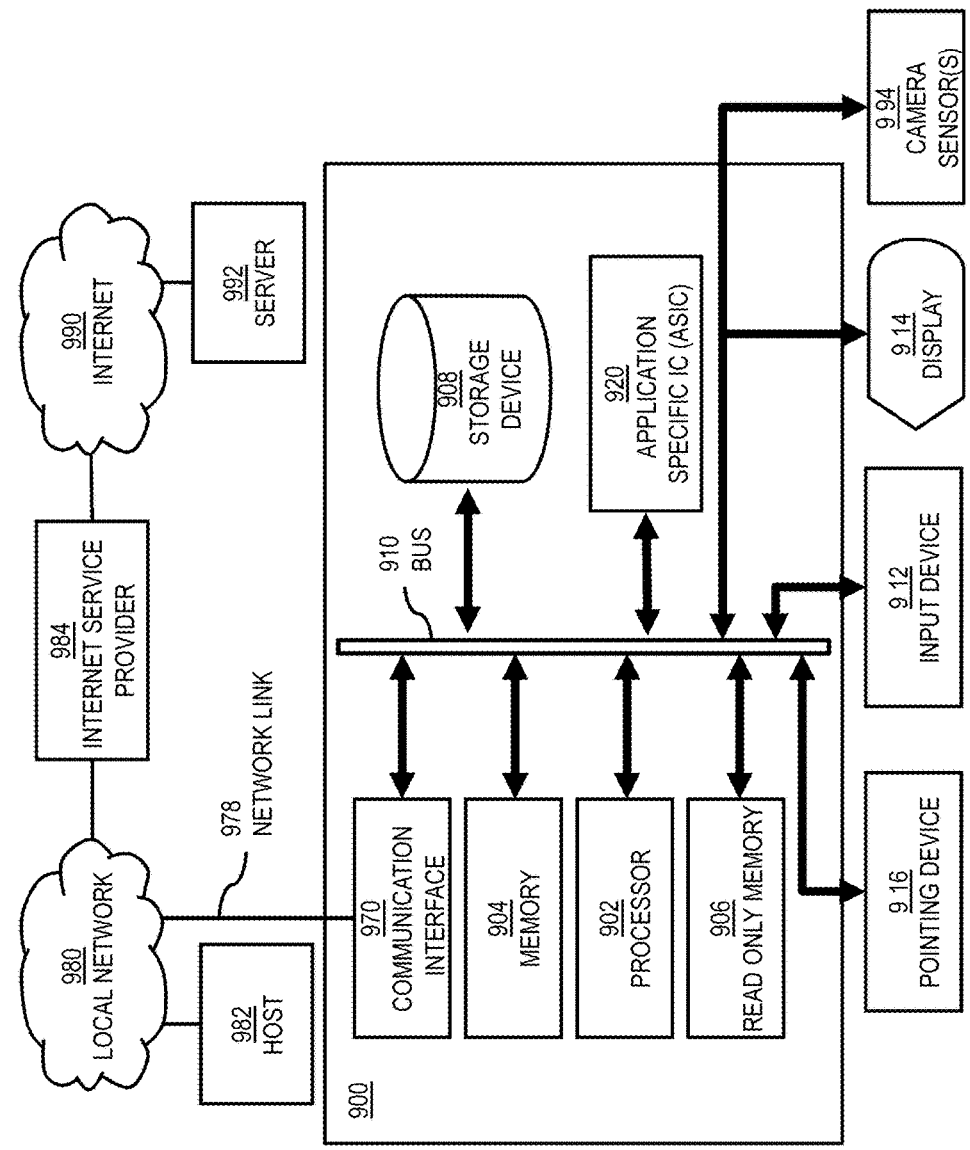
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to monitor and/or correct data from a variety of sources using pattern extraction, pattern recognition, and/or partial pattern matching as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of monitoring and/or correcting data from a variety of sources using pattern extraction, pattern recognition, and/or partial pattern matching.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to monitor and/or correct data from a variety of sources using pattern extraction, pattern recognition, and/or partial pattern matching. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for monitoring and/or correcting data from a variety of sources using pattern extraction, pattern recognition, and/or partial pattern matching. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for monitoring and/or correcting data from a variety of sources using pattern extraction, pattern recognition, and/or partial pattern matching, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for monitoring and/or correcting data from a variety of sources using pattern extraction, pattern recognition, and/or partial pattern matching to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to monitor and/or correct data from a variety of sources using pattern extraction, pattern recognition, and/or partial pattern matching as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of monitoring and/or correcting data from a variety of sources using pattern extraction, pattern recognition, and/or partial pattern matching.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to monitor and/or correct data from a variety of sources using pattern extraction, pattern recognition, and/or partial pattern matching. The memory 1005 also stores the data associated with or generated by the execution of the inventive steps.

Figure 11:
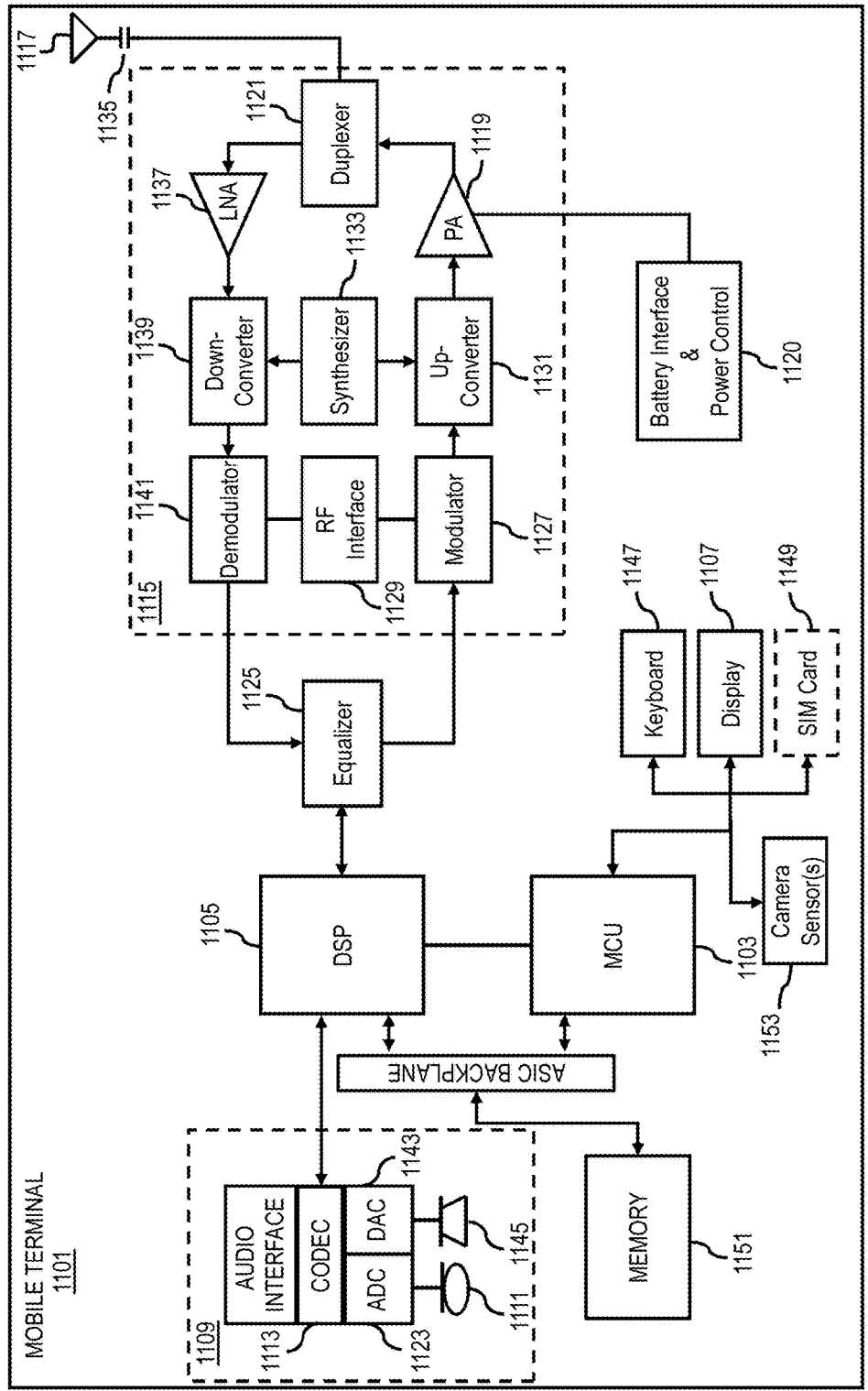
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of monitoring and/or correcting data from a variety of sources using pattern extraction, pattern recognition, and/or partial pattern matching. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of monitoring and/or correcting data from a variety of sources using pattern extraction, pattern recognition, and/or partial pattern matching. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to monitor and/or correct data from a variety of sources using pattern extraction, pattern recognition, and/or partial pattern matching. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for monitoring and updating data in a database for mapping services, comprising:
   determining, using a processor, at least one entity specified in at least one point-of-interest (POI) record of the database;
   determining one or more data sources available from the at least one entity, wherein the one or more data sources include, at least in part, at least one website of the at least one entity;
   determining that a user device is at a location of the at least one POI in the at least one POI record, wherein the location of the user device is detected using an internal global positioning system;
   initiating a presentation of a prompt for a user of the user device to capture one or more images of one or more objects at the point of interest, wherein the one or more data sources include, at least in part, the one or more images;
   processing, using the processor, the one or more images included in the one or more data sources and crawling the at least one website to determine information associated with map data;
   determining a web crawling frequency for the at least one entity via machine learning;
   determining a data pattern associated with the at least one POI record, wherein the data pattern includes a plurality of component data elements;
   determining one or more weighting factors associated with the plurality of component data elements for determining an accuracy of the one or more data sources;
   in response to each web crawling automated based on the web crawling frequency, quantifying, using the processor, a similarity of the information to the at least one POI record by matching the at least one POI record and the information for respective individual component data elements of the plurality of component data elements using partial pattern matching allowing unsalient discrepancies between the at least one POI record and the information, wherein the similarity is quantified based on which of the respective individual component data elements are matched;
   automatically verifying or updating the at least one POI record to include the information based on the quantified similarity; and
   providing data for presentation of information of the at least one verified or updated POI record on a user interface at the user device.

2. A method of claim 1, further comprising:
   determining that there is a difference between the information and the at least one POI record by comparing the quantified similarity to a threshold value,
   wherein whether to verify or update the at least one POI record is based on the difference.

3. A method of claim 1, further comprising:
   specifying the information as a ground truth; and
   determining the difference in relation to the ground truth.

4. A method of claim 1, wherein the web crawling frequency for the at least one entity is determined, at least in part, on one or more frequencies of change of the respective individual component data elements.

5. A method of claim 1, wherein the one or more data sources include, at least in part, one or more physical documents, the method further comprising:
   converting the one or more physical documents into one or more digital documents; and
   processing the one or more digital documents to determine the information.

6. A method of claim 1, wherein the verifying or updating the at least one POI record is further based, at least in part, on the one or more weighting factors.

7. A method of claim 1, further comprising:
   designating one or more salient component data elements from among the plurality of component data elements of the data pattern,
   wherein the similarity of the information to the at least one POI record is quantified by partially matching based on the one or more salient component data elements.

8. A method of claim 7, further comprising:
   determining a discrepancy between at least one of the plurality of the component data elements of the at least one POI record and the information that is not designated as the one or more salient component data elements; and
   allowing the discrepancy when determining the similarity of the information to the at least one POI record.

9. A method of claim 7, wherein the data pattern is an address data pattern, and wherein the plurality of component data elements of the address pattern includes a house number component data element, a street name component data element, a city name component data element, a state name component data element, a zip code component data element, or combination thereof.

10. A method of claim 9, wherein the house number component data element, the street name component data element, and the zip code data element are designated as the one or more salient component data elements.

11. An apparatus for monitoring and updating data in a database for mapping services, comprising:
at least one processor; and
at least one memory including computer program code for one or more programs,
the at least one memory and the computer program code configured to, with the at least one processor, cause the apparatus to perform at least the following,
determine at least one entity specified in at least one point-of-interest (POI) record of the database;
determine one or more data sources available from the at least one entity, wherein the one or more data sources include, at least in part, at least one website of the at least one entity;
determine that a user device is at a location of the at least one POI in the at least one POI record, wherein the location of the user device is detected using an internal global positioning system;
initiate a presentation of a prompt for a user of the user device to capture one or more images of one or more objects at the point of interest, wherein the one or more data sources include, at least in part, the one or more images;
process the one or more images included in the one or more data sources and crawling the at least one website to determine information associated with map data;
determine a web crawling frequency for the at least one entity via machine learning;
determine a data pattern associated with the at least one POI record, wherein the data pattern includes a plurality of component data elements;
determine one or more weighting factors associated with the plurality of component data elements for determining an accuracy of the one or more data sources;
in response to each web crawling automated based on the web crawling frequency, quantify a similarity of the information to the at least one POI record by matching the at least one POI record and the information for respective individual component data elements of the plurality of component data elements using partial pattern matching allowing unsalient discrepancies between the at least one POI record and the information, wherein the similarity is quantified based on which of the respective individual component data elements are matched;
automatically verify or update the at least one POI record to include the information based on the quantified similarity; and
provide data for presentation of information of the at least one verified or updated POI record on a user interface at the user device.

12. An apparatus of claim 11, wherein the apparatus is further caused to:
determine that there is a difference between the information and the at least one POI record by comparing the quantified similarity to a threshold value,
wherein whether to verify or update the at least one POI record is based on the difference.

13. An apparatus of claim 12, wherein the apparatus is further caused to:
specify the information as a ground truth; and
determine the difference in relation to the ground truth.

14. An apparatus of claim 11, wherein the apparatus is further caused to:
designate one or more salient component data elements from among the plurality of component data elements of the data pattern,
wherein the similarity of the information to the at least one POI record is quantified by partially matching based on the one or more salient component data elements.

15. An apparatus of claim 14, wherein the apparatus is further caused to:
determine a discrepancy between at least one of the plurality of the component data elements of the at least one POI record and the information that is not designated as the one or more salient component data elements; and
allow the discrepancy when determining the similarity of the information to the at least one POI record.

16. An apparatus of claim 14, wherein the data pattern is an address data pattern, and wherein the plurality of component data elements of the address pattern includes a house number component data element, a street name component data element, a city name component data element, a state name component data element, a zip code component data element, or combination thereof.

17. An apparatus of claim 11, wherein the web crawling frequency for the at least one entity is determined, at least in part, on one or more frequencies of change of the respective individual component data elements.

18. An apparatus of claim 11, wherein the one or more data sources include, at least in part, one or more physical documents, the apparatus is further caused to:
convert the one or more physical documents into one or more digital documents; and
process the one or more digital documents to determine the information.

19. An apparatus of claim 11, wherein the selecting of whether to verify or update the at least one POI record is further based, at least in part, on the one or more weighting factors.

* * * * *